UNITED STATES PATENT OFFICE.

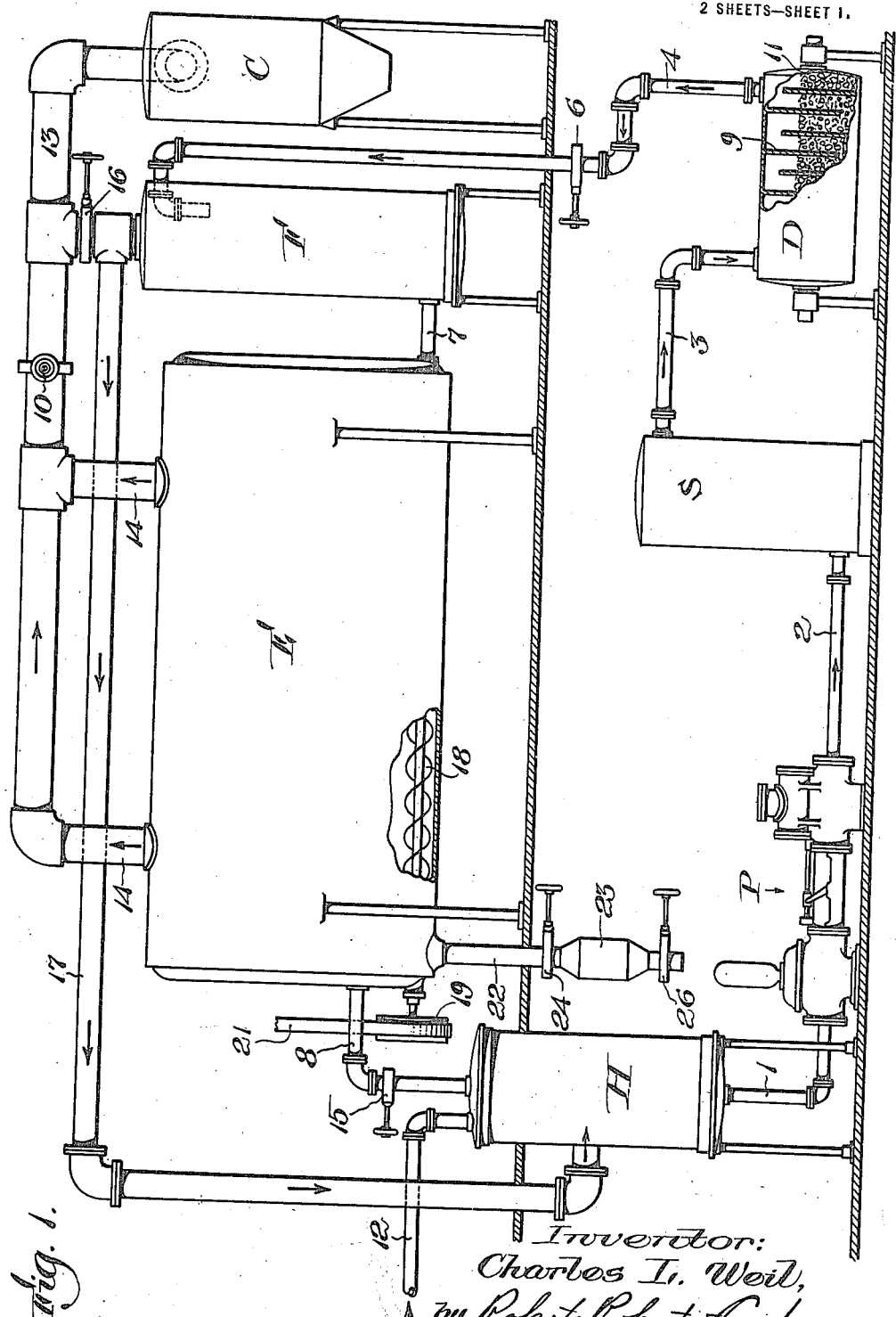

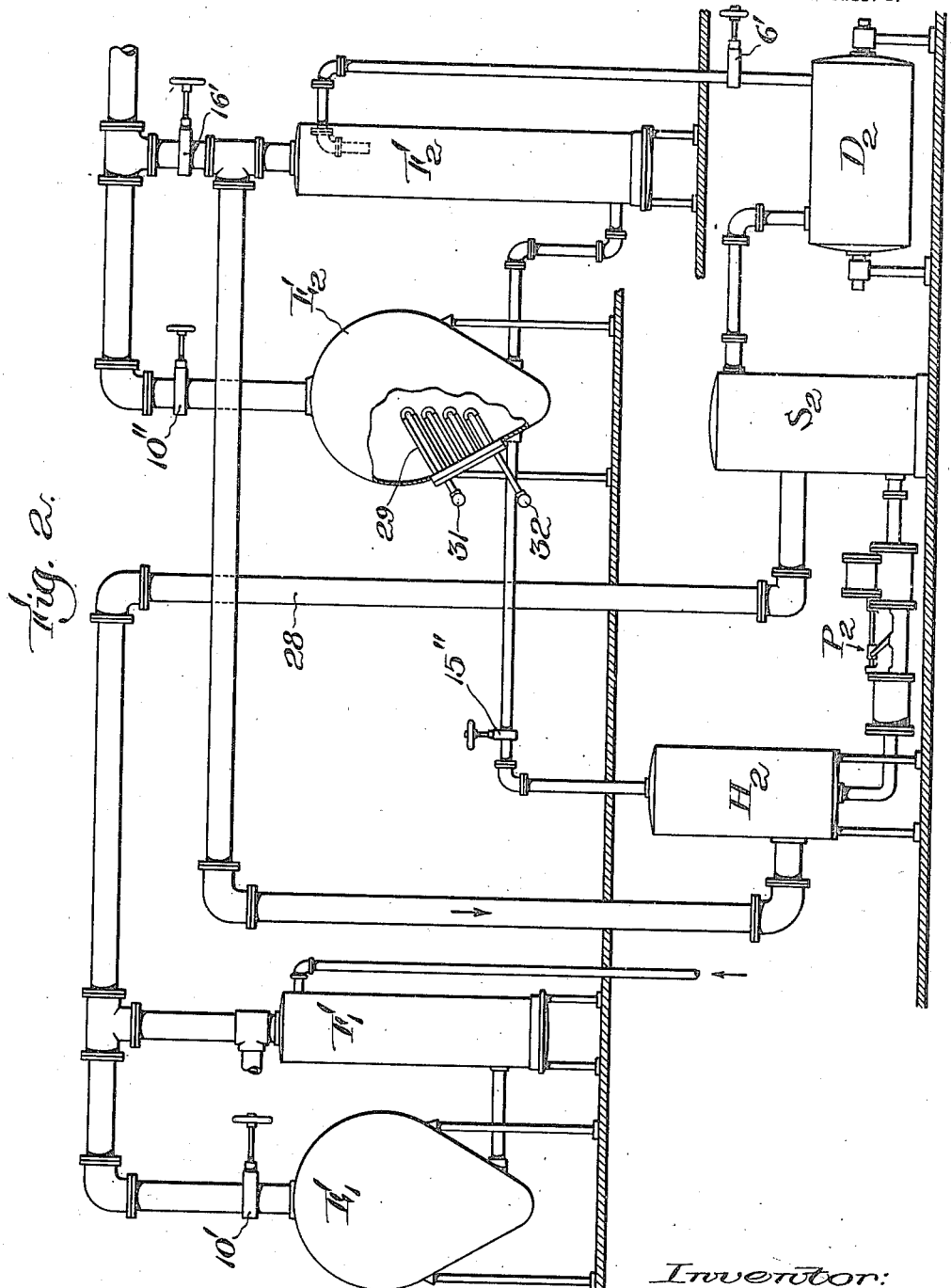

CHARLES LEWIS WEIL, OF PORT HURON, MICHIGAN.

METHOD AND SYSTEM OF SALT MANUFACTURE.

1,261,331. Specification of Letters Patent. Patented Apr. 2, 1918.

Application filed May 10, 1917. Serial No. 167,669.

*To all whom it may concern:*

Be it known that I, CHARLES L. WEIL, a citizen of the United States of America, and resident of Port Huron, in the county of St. Clair and State of Michigan, have invented new and useful Improvements in Methods and Systems of Salt Manufacture, of which the following is a specification.

This invention relates to the manufacture of salt or the like by the evaporation of brine or other liquid and more particularly the invention relates to improvements in the Alberger system of salt making.

In the so-called Alberger method of manufacturing salt, brine is continuously circulated through an evaporating system, the brine being heated at one or more points of the system and being permitted to evaporate at other points, thereby being caused to give up the salt contained therein. The Alberger system, in its simpler form, is usually arranged substantially as disclosed in my former United States Patent No. 1,141,999 to which I make reference for a more thorough understanding of the system in its entirety.

In brief, the system is comprised and operated as follows: The brine is first heated in a preheater to a temperature somewhat below the boiling point, which is approximately 226° F. for saturated brine. Thence the brine is pumped under sufficient pressure to prevent boiling to a superheater where it is heated for example to a temperature of the order of 275° F. Thence it is conducted, still under pressure, to a filter in which impurities such as gypsum are removed, the gypsum precipitating at a temperature of the order of 275° F. From the filter the superheated brine is conducted to a flasher that is, a closed evaporating vessel in which the pressure is atmospheric or at least much lower than in the superheater and filter, and in the flasher the brine flashes or boils violently owing to the reduction of pressure to a point considerably below that at which the superheated brine will boil. From the flasher the rich, saturated brine is passed to an evaporating pan at a temperature approximately of the boiling point and in the evaporating pan it is allowed to cool about twenty-five degrees, surface evaporation taking place at the expense of the contained heat of the brine. The portion of the brine which is not evaporated either in the flasher or in the pan, the so-called tail brine, is conducted to the preheater and thence again over the described course new brine being supplied to the preheater in sufficient quantity to compensate for the evaporation in the flasher and pan.

In the flasher the rapid evaporation together with the violent agitation produced by the flashing of steam from the already saturated brine produces fine, clean-cut and well-formed crystals of salt which are carried over into the evaporating pan suspended in the brine. In the evaporating pan large crystals of salt are produced at the surface of the brine due to the slow surface evaporation taking place, and in connection with this surface formation of salt a very important phenomenon of the Alberger process takes place, viz.: To the crystals formed at the surface by slow evaporation the fine crystals produced in the flasher adhere or build and by virtue of this building-up process crystals of a wide variety of sizes are formed. This building-up action is probably accelerated by the cooling of the brine in the pan. Moreover, the building process takes place to a certain extent throughout the body of the brine. The large crystals formed at the surface of the brine and the smaller crystals formed in the body of the brine, together with some of the fine crystals produced in the flasher, are caused to settle to the bottom of the pan and are then drawn off by a trap, a static leg, or by other suitable means. The salt is then dried and screened, the crystals being separated according to size and thus affording the various commercial grades known as table, butter, meat, ice-cream, and other salts.

Whereas common salt produced by the ordinary methods is composed of hard cubical grains or of grains of a more or less hard and relatively coarse granular structure, Alberger salt is composed of flakes of finely formed crystalline structure. It will dissolve more readily and will flavor food more uniformly than will the ordinary grades of salt. The unique characteristics of Alberger salt are believed to be due in part to the violent boiling of the brine in the flasher, whereby fine crystals of salt are produced, and in part to the building-up process in the evaporating pan, whereby the fine crystals of salt produced in the flasher and carried over into the pan are caused to knit together or build up and thus form crystals of larger size but of the same clean-cut and high-grade character.

While the superiority of Alberger salt has been generally recognized for many years it has also been well known that the method presents a serious difficulty, namely, the difficulty of controlling the proportionate amounts of the crystals of different sizes. Throughout the seasons of the year the demand for the various grades varies widely and to meet the varying demand it has been necessary to store large quantities of certain grades during different seasons. Many methods for controlling the quantitative formation of the crystals of the different sizes have been proposed, but so far as I am aware none of them have been wholly satisfactory. Some of the methods are complicated and lead to other difficulties while others are inadequate for effecting a sufficient control.

The principal objects of the present invention are to overcome the above and other difficulties heretofore appertaining to the most economical operation of the Alberger system, to control completely and efficiently the proportionate amounts of the various grades of salt yielded by the Alberger process, to adapt the system to the use of steam or other heating mediums at different temperatures, thereby permitting the use of exhaust steam at different stages of temperature and pressure and permitting an economical operation of a plurality of systems in series, and to increase the efficiency and economy of the system generally.

Other objects of the invention, such as the provision of certain improved apparatus, will be apparent from the following description and the accompanying drawings in which,—

Figure 1 is an elevational view, more or less diagrammatic, showing one embodiment of my improved system, parts being broken away and parts being shown in section; and Fig. 2 is a similar view of a plurality of systems connected in series, certain details of improvement being shown therein.

My improved system shown in Fig. 1 resembles the ordinary Alberger system in that it comprises a preheater H for heating the brine to a temperature of the order of the boiling point, a second heater S for superheating the brine to a temperature considerably above the boiling point, for example, of the order of 275°, a filter D, a flasher F, an evaporator E and a condenser C. The brine is circulated around this system by means of gravity and a pump P, the brine passing from the preheater H to the pump through pipe 1, from the pump to the superheater through pipe 2, from the superheater to the filter D through pipe 3, from the filter D to the flasher F through pipe 4, a valve 6 being provided in pipe 4 to regulate the flow of liquid therethrough, the portion of the brine which is not evaporated in the flasher F passing from the flasher to the evaporator E through the pipe 7, and the portion of the brine which is not evaporated either in the flasher or in the evaporator passing to the preheater H through the pipe 8, so as again to make the circuit, a valve 15 being provided in pipe 8 to regulate the flow from the evaporator to the preheater.

By suitably regulating the valve 6 the pressure of the brine in the superheater S and filter D can be maintained sufficiently high to prevent evaporation of the brine in this portion of the system. The gypsum and other impurities contained in the brine are precipitated by the high temperature imparted to the brine in the superheater and are removed from the brine in passing through the tortuous passage formed in the filter D by the baffle-plates 9 extending in staggered relationship from the opposite sides of the inner wall of the filter, stones 11 or other suitable material being provided within the filter upon which the gypsum adheres. New brine is continuously supplied to the system through pipe 12 so that the quantity of brine circulating through the system is maintained substantially constant notwithstanding continuous evaporation in the flasher F and evaporator E. The heaters H and S may be of any desired construction, but they are preferably constructed as disclosed in my prior patent above referred to.

The flasher F communicates with the condenser C through a pipe 13, and the evaporator E communicates with the condenser in like manner through pipes 14. The pressure in the flasher F may be regulated by controlling the temperature in the condenser C or by means of a valve 16. The pressure in evaporator E may be regulated by means of a valve 10 in pipe 14. Owing to the removal of pressure from the brine after it passes through the valve 6 into the flasher F, it flashes or boils rapidly in the flasher, as above described. Inasmuch as the saturated brine boils in flasher F at a temperature of the order of 226° F., the steam given off in the flasher F is more or less superheated depending upon the pressure in the flasher, and it may therefore be employed in heating the preheater H, the steam being conducted from the flasher to the preheater through pipe connections 17.

My improved evaporator E is preferably drum-shaped, that is, it is preferably curved in cross-section and preferably considerably longer than it is wide; indeed in practice I prefer to make the length about one hundred diameters. Moreover, the improved evaporator is preferably egg-shaped in cross-section, that is, it is wider at the top than at the bottom, the sides gradually drawing inwardly as they extend downwardly. This construction affords several advantages, chief of which is that the surface area of the liquid in the vessel varies as the depth of the liquid in the vessel is increased or decreased. However, it is to be understood that the evaporator may be varied in shape and still afford this important function and that any suitable means for varying the extent of the exposed area of the brine may be employed. Another advantage in having the evaporator of the peculiar cross-sectional contour, more particularly illustrated in Fig. 2, is that the precipitated crystals of salt or the like are caused to accumulate in the trough-like bottom of the condenser in such manner as to be readily collected and removed.

The preferred method of removing the precipitated salt is that illustrated in Fig. 1, which comprises a screw conveyer 18 disposed in the bottom of the evaporator and extending longitudinally of the evaporator. Suitable means for operating the screw conveyer 18 comprises pulley 19 and belt 21 disposed on the outside of the evaporator and driven by any suitable means. The conveyer is rotated in such direction as to move the salt toward the left-hand end (Fig. 1) of the evaporator and at the left-hand end of the evaporator means is provided for withdrawing the salt from the container. While I may use any suitable means such as the well-known static leg for this purpose, I prefer to employ means such as illustrated in Fig. 1. This means comprises a depending pipe 22 connecting with a drum 23, valves 24 and 26 being disposed above and below the drum 23. By opening valve 24 and closing valve 26 salt may be allowed to settle into the drum 23. After the drum becomes partially or entirely filled the valve 24 is closed and the valve 26 opened so that the salt within the drum is dumped out. By this means the brine within the evaporator is prevented from escaping in any considerable amount and the pressure in the evaporator is not disturbed.

As illustrated in Fig. 2, the system may, by virtue of my improvements, be compounded, that is, a plurality of complete systems of circulation may be arranged in series, the steam generated in one system being employed in the heaters of a succeeding system. In Fig. 2 parts of one complete circulating system are shown at the left-hand end, these parts comprising the evaporator $E_1$ and the flasher $F_1$; and parts of another circulating system are shown at the right-hand end, these parts comprising preheater $H_2$, pump $P_2$, superheater $S_2$, filter $D_2$, flasher $F_2$ and evaporator $E_2$. Owing to the fact that the evaporator of my improved system is closed, it may be operated under a temperature and pressure considerably greater or less than is ordinarily employed. If the pressure in evaporator $E_1$ in Fig. 2, for example, be maintained considerably above atmospheric the steam given off by this evaporator will be at a relatively high temperature and can therefore be employed in the superheater of the succeeding circulating system at the right-hand end of the figure. I therefore propose to connect the evaporator $E_1$ and flasher $F_1$ of the one system to the superheater $S_2$ of the succeeding system by means of a pipe 28, the respective elements of the left-hand circuit comprising $E_1$, $F_1$, etc., and the elements of the right-hand circuit comprising $E_2$, $F_2$, etc., being connected together in the same manner as in Fig. 1. The pressure in evaporator $E_1$ may be controlled by means of valve 10, but it is preferably controlled by regulating the pressure in superheater S.

It will be understood from the above description that when using a plurality of circulating systems in series the pressures and temperatures throughout the first system will be higher than the pressures and temperatures throughout the succeeding system. For example, the first system may operate throughout a range of temperature from 200° to 275°, and the second system may operate throughout a temperature range of from 200° to 125°. By virtue of this arrangement, which results from the use of a closed evaporator instead of an open evaporating pan, steam produced in the first system may be employed in the second system instead of being conducted to a condenser where its heat content is wasted.

In Fig. 2 I have also illustrated means for controlling the temperature of the liquid in the evaporator, this means comprising, for example, loops of piping 29 extending inwardly from one side of the evaporator, these loops being connected at their respective ends with a pipe 31 for supplying a heating or cooling fluid and to a pipe 32 for conducting away the temperature controlling medium. The temperature controlling means may be employed either to retard or accelerate the cooling of the brine in the evaporator, depending upon whether an increased proportion of coarse or fine salt is desired. It is to be understood that the temperature controlling means shown in Fig. 2 is intended to be used when employing a single system as shown in Fig. 1, as well as when employing two or more systems in series.

In the flashing operation taking place in the flasher F a certain amount of pressure is produced which tends to force the liquid in the flasher through the connection 7 into the evaporator. While the pressures in the flasher and evaporator respectively may be so adjusted as to prevent steam being forced through the connection 7 from the flasher to the evaporator, I may also provide the means illustrated at the right-hand side of Fig. 2 for this purpose. This consists in placing the flasher at a level lower than the evaporator so that the steam in the flasher must operate against a greater head of liquid before it can pass into the evaporator, the flasher $F_2$ being shown at a lower level than the evaporator $E_2$. By suitably determining the levels of the evaporator and flasher for any given set of pressures in the respective vessels, the steam in the flasher can be prevented from escaping into the evaporator. Moreover, a higher pressure can be maintained in the flasher in this way, whereby the steam from the flasher may be more effectively utilized.

From the above description of my improved system the new method operation forming a part of the present invention may now be readily made clear. Instead of conducting the brine from the flasher to an open pan it is conducted, according to the present invention, to the closed evaporator E in which the temperature may be regulated by the coils 29 and in which the pressure may be regulated by means of the valves 10. By closing the valve 10 and thereby increasing the pressure in the evaporator, the rate of evaporation and consequently the rate of cooling in the evaporator is decreased; conversely, by opening the valve the steam is allowed to escape more rapidly to the condenser C, thereby permitting the pressure to be maintained at a lower value. By passing hot water, steam, or other heated fluid through the coils 29 the temperature of the brine within the evaporator may be increased, thereby decreasing the rate of cooling; conversely, by passing a cooling fluid through the coils 29 the rate of cooling of the brine may be accelerated. Moreover, the rate of surface evaporation may be increased or decreased by varying the level of brine in the evaporator, the brine preferably being maintained at the level of the maximum diameter of the evaporator under average conditions of operation. In the drawings I have illustrated a valve 15 for controlling the level of the brine in the evaporator.

As above explained, the proportionate amounts of the larger and finer grades of salt produced by the Alberger system may be controlled by regulating the temperature, pressure and surface area of the brine in the evaporator. While this control may be effected by varying any one or more of these factors, a complete, flexible, and satisfactory control is afforded only by the conjoint use of all of these means. If the temperature and pressure alone are varied the rate of evaporation may be correspondingly varied, but the rate at which the building-up process takes place throughout the body of the brine is also varied. On the contrary, by merely varying the surface area of the brine in the evaporator the quantity of larger salt produced at the surface of the brine may be controlled to a large extent, but the ratio of the salt produced by the building-up action within the brine to the salt produced by a direct precipitation of the fine crystals coming from the flasher cannot be adequately controlled. By varying the pressure alone the surface evaporation and consequently the proportionate amount of coarse surface salt may be controlled to a certain extent, but the ratio of the salt produced by the building-up action within the brine to the salt produced by a direct precipitation of the fine crystals coming from the flasher cannot be adequately controlled. By varying the temperature alone the action within the body of the brine may be regulated but the rate of evaporation at the surface of the brine and the building-up action at the surface cannot be adequately controlled. However, by varying both the temperature and the pressure and also the surface area of the brine the proportionate quantities of large, fine and intermediate sizes of salt may be completely and effectively controlled.

Another advantage flowing from the present invention is that above adverted to, which consists in the ability to operate the system throughout any desired temperature range, the system being wholly inclosed and therefore largely independent of the atmospheric pressure.

I am aware that it has been heretofore proposed to employ closed evaporating pans and to control the temperature and pressure in such closed evaporators. I do not claim, therefore, to be the originator of such broad features, but I believe myself to be the first to reorganize an Alberger system in the manner herein disclosed. By virtue of this reorganization the outut of the various grades of salt may be regulated throughout the seasons to meet the varying demand.

It is to be understood that the term "boiling point" is herein used to refer to the temperature at which ebullition takes place under the particular conditions of pressure existing, and that it is not limited, unless specifically so stated, to the boiling temperature under atmospheric pressure. The system may be operated throughout any desired range of temperatures and pressures according to the present invention and the boiling point will depend upon the particular range of pressure employed. Whatever the range of temperature the pressure in the evaporator is maintained at such value that ebullition will not take place, at least in any appreciable measure, in the evaporator; conversely, the temperatures of the brine in the flasher and evaporator are maintained at such value that the temperature of the brine entering the evaporator will be at approximately the boiling point for the particular pressure existing in the evaporator, whether it be atmospheric pressure, or above or below atmospheric pressure.

I claim:

1. The method of manufacturing salt from brine comprising first boiling the brine so as to produce relatively small crystals of salt, then cooling the brine to a temperature considerably below the boiling point, at the same time permitting it to evaporate so as to form relatively large crystals of salt at the surface of the brine and so as to build up the small crystals upon the large crystals, some of the small crystals being caused to build up crystals within the body of the brine and some of the small crystals being permitted to settle without substantial building up, and controlling the rate of cooling of the brine during evaporation, independently of the rate of evaporation, so as to regulate the proportionate quantities of large and small crystals thus produced.

2. The method of manufacturing salt from brine comprising first boiling the brine so as to produce relatively small crystals of salt, then cooling the brine in a closed space to a temperature considerably below the boiling point, at the same time permitting it to evaporate so as to form relatively large crystals of salt at the surface of the brine and so as to build up the small crystals upon the large crystals, some of the small crystals being caused to build up crystals within the body of the brine, and some of the small crystals being permitted to settle without substantial building up, and controlling the pressure in the closed space during evaporation so as to regulate the proportionate quantities of large and small crystals thus produced.

3. The method of manufacturing salt from brine comprising first boiling the brine so as to produce relatively small crystals of salt, then cooling the brine to a temperature considerably below the boiling point, at the same time permitting it to evaporate so as to form relatively large crystals of salt at the surface of the brine and so as to build up the small crystals upon the large crystals, some of the small crystals being caused to build up crystals within the body of the brine and some of the small crystals being permitted to settle without substantial building up, and controlling the extent of the exposed area of the evaporating brine so as to regulate the proportionate quantities of large and small crystals produced.

4. The method of manufacturing salt from brine comprising superheating the brine, permitting the brine to flash, thereby producing relatively small crystals of salt, then evaporating the brine at a temperature below the boiling point so as to form relatively large crystals of salt at the surface of the brine and so as to build up the small crystals upon the large crystals, some of the small crystals being permitted to settle in the brine, and controlling the temperature of the evaporating brine independently of the rate of evaporation so as to regulate the proportionate quantities of large and small crystals thus produced.

5. The method of manufacturing salt from brine comprising superheating the brine, permitting the brine to flash, thereby producing relatively small crystals of salt, then evaporating the brine in a closed space at a temperature below the boiling point so as to form relatively large crystals of salt at the surface of the brine and so as to build up the small crystals upon the large crystals, some of the small crystals being permitted to settle in the brine, and controlling the pressure in the closed space so as to regulate the proportionate quantities of large and small crystals thus produced.

6. The method of manufacturing salt from brine comprising superheating the brine, permitting the brine to flash, thereby producing relatively small crystals of salt, then evaporating the brine at a temperature below the boiling point so as to form relatively large crystals of salt at the surface of the brine and so as to build up the small crystals upon the large crystals, some of the small crystals being permitted to settle in the brine, and controlling the surface area of the evaporating brine so as to regulate the proportionate quantities of large and small crystals thus produced.

7. In manufacturing salt from brine by first flashing the brine then slowly evaporating the brine in a closed vessel, the method of regulating the proportionate quantities of large and small crystals of salt produced comprising regulating the temperature of the brine in the evaporating vessel independently of the rate of evaporation.

8. In manufacturing salt from brine by first flashing the brine and then slowly evaporating the brine in a closed vessel, the method of regulating the proportionate quantities of large and small crystals of salt produced comprising regulating the pressure of the brine in the closed evaporating vessel.

9. In manufacturing salt from brine by first flashing the brine and then slowly evaporating the brine in a closed vessel, the method of regulating the proportionate quantities of large and small crystals of salt produced comprising regulating the exposed area of the brine in the evaporating vessel.

10. A system for the manufacture of salt comprising an evaporator arranged to permit evaporation of brine at a temperature above the boiling point so as to produce relatively small crystals of salt, a second evaporator, means to conduct the brine containing the small crystals of salt to the second evaporator, the second evaporator being arranged to permit further evaporation of the brine at a temperature below the boiling point so as to form relatively large crystals of salt at the surface of the brine and so as to permit the small crystals to build upon the large crystals in part and in part to settle to the bottom of the evaporator, and means for regulating the temperature of the brine in the second evaporator independently of the rate of evaporation so as to regulate the proportionate quantities of relatively large and small crystals of salt produced.

11. A system for the manufacture of salt comprising an evaporator arranged to permit evaporation of brine at a temperature above the boiling point so as to produce relatively small crystals of salt, a second evaporator, means to conduct the brine containing the small crystals of salt to the second evaporator, the second evaporator being arranged to permit further evaporation of the brine at a temperature below the boiling point so as to form relatively large crystals of salt at the surface of the brine and so as to permit the small crystals to build upon the large crystals in part and in part to settle to the bottom of the evaporator, and means for regulating the temperature and surface area of the brine in the second evaporator so as to regulate the proportionate quantities of relatively large and small crystals of salt produced.

12. A system for the manufacture of salt comprising an evaporator arranged to permit evaporation of brine at a temperature above the boiling point so as to produce relatively small crystals of salt, a second evaporator, means to conduct the brine containing the small crystals of salt to the second evaporator, the second evaporator being arranged to permit further evaporation of the brine at a temperature below the boiling point so as to form relatively large crystals of salt at the surface of the brine and so as to permit the small crystals to build upon the large crystals in part and in part to settle to the bottom of the evaporator, and means for regulating the surface area of the brine in the second evaporator so as to regulate the proportionate quantities of relatively large and small crystals of salt produced.

13. A system for the manufacture of salt comprising an evaporator arranged to permit evaporation of brine at a temperature above the boiling point so as to produce relatively small crystals of salt, a second evaporator, means to conduct the brine containing the small crystals of salt to the second evaporator, the second evaporator being arranged to permit further evaporation of the brine at a temperature below the boiling point so as to form relatively large crystals of salt at the surface of the brine and so as to permit the small crystals to build upon the large crystals in part and in part to settle to the bottom of the evaporator, and means for regulating the pressure and surface area of the brine in the second evaporator so as to regulate the proportionate quantities of relatively large and small crystals of salt produced.

14. A system for the manufacture of salt comprising an evaporator arranged to permit evaporation of brine at a temperature above the boiling point so as to produce relatively small crystals of salt, a second closed evaporator, means to conduct the brine containing the small crystals of salt to the second evaporator, the second evaporator being arranged to permit further evaporation of the brine at a temperature below the boiling point so as to form relatively large crystals of salt at the surface of the brine and so as to permit the small crystals to build upon the large crystals in part and in part to settle to the bottom of the evaporator, and means for regulating the pressure in the closed evaporator so as to regulate the proportionate quantities of relatively large and small crystals of salt produced.

15. A system for the manufacture of salt comprising a series of complete systems of circulation for brine, each system including a flasher, an evaporator, and a superheater for heating the brine above the boiling point prior to its release into the flasher, at least one of the evaporators being closed so that the pressure therein may be regulated, and means for conducting the steam produced in the said one evaporator to the superheater of a succeeding system, the cycle of temperatures and pressures in the one system being higher than in the succeeding system.

16. A system for the manufacture of salt and the like comprising an evaporator for boiling the brine, a second evaporator for slowly evaporating the brine, means for conveying the brine from the first evaporator to the second evaporator, the second evaporator having flaring side walls so that the surface area of a body of liquid contained within the evaporator varies with the depth of the liquid, and means for controlling the depth of liquid in the second evaporator, thereby to control the rate of surface evaporation and proportionate quantities of large and small crystals of salt produced.

17. In a system for the manufacture of salt and the like, the combination of an evaporator for boiling the brine, a second evaporator for slowly evaporating the brine, means for conveying the brine from the first evaporator to the second evaporator, the second evaporator having an egg-shaped cross-sectional contour, and means for regulating the depth of liquid in the second evaporator, thereby to regulate its surface area.

18. In a system for the manufacture of salt and the like, the combination of a flashing evaporator for boiling the brine, a drum-shaped evaporator for slowly evaporating the brine, the cross-sectional contour of the drum being egg-shaped and the smaller side of the drum being directed downwardly, and means for moving the crystals precipitated in the small side of the drum longitudinally of the drum.

19. In a system for the manufacture of salt and the like, the combination of a flashing evaporator for boiling the brine, a drum-shaped evaporator for slowly evaporating the brine, the cross-sectional contour of the drum being egg-shaped and the smaller side of the drum being directed downwardly, and a screw extending longitudinally of the drum along the bottom of the small side thereof for collecting the precipitated crystals.

20. In manufacturing salt from brine by first flashing the brine and then slowly evaporating the brine in a closed vessel, the method of regulating the proportionate quantities of large and small crystals of salt produced comprising conjointly regulating the pressure and temperature of the brine in the closed evaporating vessel.

21. In manufacturing salt from brine by first flashing the brine and then slowly evaporating the brine in a closed vessel, the method of regulating the proportionate quantities of large and small crystals of salt produced comprising conjointly regulating the pressure and temperature and surface area of the brine in the closed evaporating vessel.

22. A system for the manufacture of salt comprising an evaporator arranged to produce rapid ebullition of brine therein, a second evaporator, and means for conducting brine from the first evaporator to the second evaporator, the second evaporator being arranged to permit slow evaporation therein and being closed so that the pressure therein may be controlled.

23. A system for the manufacture of salt comprising an evaporator arranged to produce rapid ebullition of brine therein, a second evaporator so shaped and arranged that the surface may be varied, means for conducting the brine from the first evaporator to the second evaporator, the second evaporator being closed, and means for regulating the pressure and surface area of the brine in the second evaporator.

Signed by me at Port Huron, Michigan, this 30th day of April, 1917.

CHARLES LEWIS WEIL.